United States Patent [19]

Murphy

[11] 4,280,265

[45] Jul. 28, 1981

[54] PLIERS

[76] Inventor: James W. Murphy, 1001 Skylark Dr., Denton, Tex. 76201

[21] Appl. No.: 73,747

[22] Filed: Sep. 10, 1979

[51] Int. Cl.$^3$ .............................................. B23P 19/04

[52] U.S. Cl. ........................................ 29/229; 81/302; 81/385; 81/387

[58] Field of Search .................... 29/229, 268; 81/302, 81/385-394, 341, 316, 342, 406

[56] References Cited

U.S. PATENT DOCUMENTS

| | | | |
|---|---|---|---|
| 1,514,488 | 11/1924 | Wernimont | 81/387 |
| 2,355,035 | 7/1943 | Gardile | 81/391 |
| 2,483,383 | 9/1949 | Heimann et al. | 81/385 |
| 3,132,550 | 5/1964 | Sion | 81/302 |
| 3,662,449 | 5/1972 | Hashimoto | 29/229 |
| 3,762,019 | 10/1973 | Epstein | 81/394 |

*Primary Examiner*—James L. Jones, Jr.
*Attorney, Agent, or Firm*—Larry B. Dwight

[57] ABSTRACT

Retaining ring pliers having coplanar jaws independently and movably secured and handles independently and rotatably secured about the pivot. Fulcrum pins slideably disposed in each of the jaws being equal distance from the pivot. The pins may alternately engage first handle and first jaw and second handle and second jaw and be reversed such that the first handle engage the second jaw and the second handle engage the first jaw.

9 Claims, 9 Drawing Figures

10
12
14
16
18
24
26
30
32
34
36
38
40
42
44
46
48
50
52
54
56
58
60
62
64
66
68
70
72
74
3
5

PLIERS

BACKGROUND OF THE INVENTION

This invention relates to an improvement in pliers used to expand or contract the jaws, and is particularly suited to retaining ring pliers adapted to remove and secure snap rings and retaining rings in place. The pliers may be used to remove or replace retaining rings, fuses or small light bulbs and the like where space doesn't permit fingers to grasp same.

Retaining rings are utilized in annular grooves on shafts and ends of shafts to retain bearings, collars, and other material on the shaft. Some rings are fitted internally such that internal pressure is needed to remove and secure the ring within the interior of a groove. Other rings are fitted externally of a groove formed externally of the shaft and need external pressure for removal and replacement. The pliers have special tips adapted to fit the apertures in the rings to squeeze or expand the ring as necessary for removal.

Heretofore, one type of pliers comprise fixed handles and jaws arranged in an X-shape to move the tips inwardly as the handles are squeezed to remove internal rings. Other types of X-shape pliers have fixed jaws and handles arranged to move externally as the handles are squeezed together.

Pliers which heretofore have been designed to function in both manners utilized linkages which must be disengaged and reassembled in order to change the handle arrangement. These types of pliers still use an X-shape handle arrangement but require disassembly to a certain extent.

Other devices have used sliding jaws such as those disclosed in U.S. Pat. No. 3,662,449. These types of jaws move laterally by sliding.

Other types of crimping devices and washer removal tools use a double pivot for extra strength which is also disclosed in U.S. Pat. Nos. 2,684,004 and 2,737,837. There are various types of watch bow pliers such as those disclosed in U.S. Pat. Nos. 21,525 and 514,799.

None of the disclosed devices utilized a common fixed pivot point in conjunction with separate handles and jaws to change from an internal retaining ring tool to an external retaining ring tool.

SUMMARY

I have devised a new pair of retaining ring pliers which utilize a pair of separate jaws and a pair of separate handles arranged about a common fixed pivot point having a pair of fulcrum points adapted to be changed to alternately engage one handle then another to change the fulcrum point to permit the changing of the tool from external to internal tool.

The device has a pair of coplanar jaws movable about a common pivot. The jaws have half a shoulder formed about the pivot such that the shoulders form a concentric shoulder about the pivot. The shoulders receive the handles on the opposed sides of the jaws such that the handles pivot about the common pivot on the shoulder. There are two fulcrum pins disposed in the jaws and adapted to alternately engage each set of handles to shift the fulcrum point from a position adapted to move the jaws inwardly as the handles are moved inwardly where the jaws are adapted to move outwardly as the handles are moved inwardly.

An alternate form of the invention has overlapping jaws about a common pivot. The handles are moved relatively to the jaws such that the fulcrum point is shifted to an opposite side of the pivot by movement of the handles.

A primary object of the invention is to provide retaining ring pliers having jaws in cooperative relationship with the handles and fulcrum pins to engage and disengage each of the handles alternately to change the pivot force exerted through the handles to open and close or expand and contract the jaws when the handles are closed.

A further object of the invention is to provide retaining ring pliers which may be switched from an internal to an external tool without disassembly or rearrangement of linkage pins which requires much time and also enlarges the tool such that it may not be used in small areas.

A still further object of the invention is to provide retaining pliers which may be changed from internal to external tool by simply pushing pins in and out of engagement to change the fulcrum point and still maintain the integrity, stability and strength of the tool.

Other and further objects of the invention will become apparent upon the studying of the detail descriptions hereinafter following and the drawings annexed hereto.

DESCRIPTIONS OF THE DRAWINGS

Drawings of two preferred embodiments of the invention are attached hereto so that the invention may be better and more fully understood, in which.

Numeral references are used to designate like parts throughout the various figures of the drawings.

DESCRIPTION OF A PREFERRED EMBODIMENTS

Figures 1, 2, 3, 4:
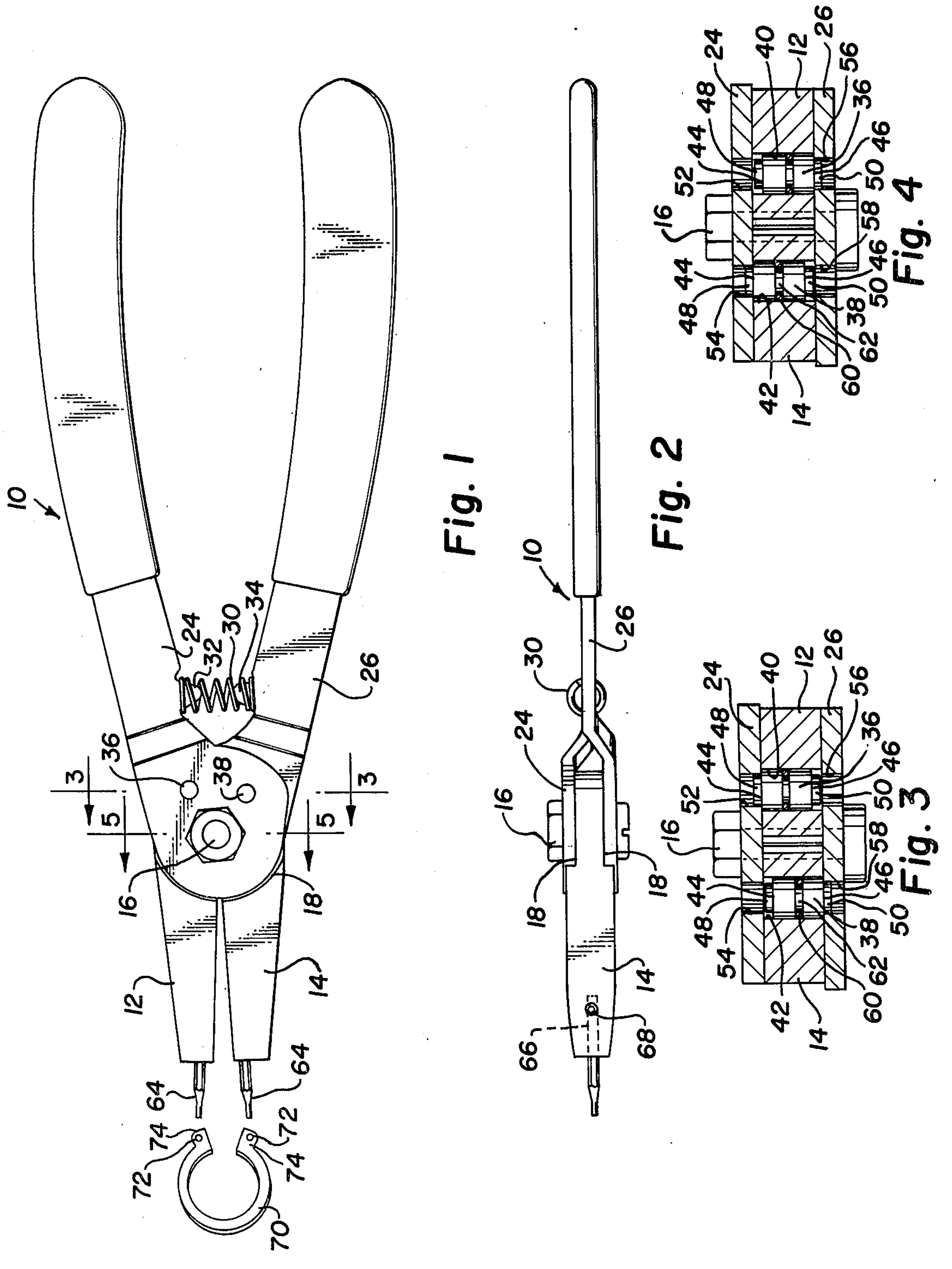
FIG. 1 is the top plan view of the first embodiment of the retaining ring plier.
FIG. 2 is a side elevation view thereof.
FIG. 3 is a cross-sectional view taken along line 3—3 of FIG. 1.
FIG. 4 is a cross-sectional view similar to FIG. 3 showing the fulcrum pins in an alternate position.
Figure 5:
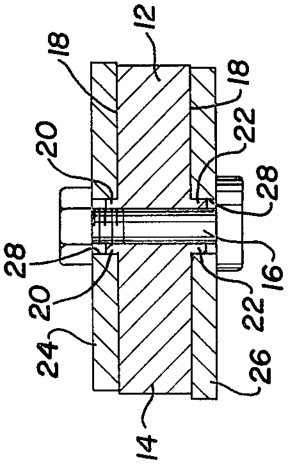
FIG. 5 is a cross-sectional view along line 5—5 of FIG. 1.

Referring to FIGS. 1, 2 and 5 the retaining ring pliers are generally designated by the numeral 10 and have first and second coplanar movable jaws 12 and 14. The movable jaws 12 and 14 are arranged to have axial movement about a pivot which generally comprises a bolt or rivet 16. Each of the jaws 12 and 14 have a recessed area 18 that allows formation of semi-circular bearing shoulders 20 and 22 on the upper and lower surfaces of the jaws 12 and 14.

First and second handles 24 and 26 have a bearing passage 28 formed therein, illustrated in FIG. 5, which is aligned over bearing shoulders 20 and 22 of jaws 12 and 14. The shoulders acting together form a concentric shoulder about the pivot 16. It should be readily apparent that each of of the jaws 12 and 14 and handles 24 and 26 are independently rotatable about pivot 16. It should be further readily apparent that bearing shoulders 20 and 22 on jaws 12 and 14 provide a precise bearing surface which prevents wear on the actual pivot pin 16 from the handles 24 and 26. The first and second handles 24 and 26 are urged apart by spring 30 disposed between two opposed lugs 32 and 34 on the interior sides of first and second handles 24 and 26 respectively.

Means to alternately engage and disengage handles 24 and 26 to jaws 12 and 14 comprises fulcrum pins 36 and 38 slideably disposed in cylindrical bores 40 and 42 formed in jaws 12 and 14 respectively between the pivot 16 and the outward ends of handles 24 and 26. Fulcrum pins 36 and 38 coincide with the fulcrum points of handles 24 and 26. Fulcrum pins 36 and 38, as illustrated in FIG. 3, have shoulders 44 and 46 formed by the reduced diameter of ends 48 and 50. The reduced ends 48 and 50 are adapted to slide into apertures 52, 54, 56 and 58 formed in handles 24 and 26. The shoulders 44 and 46 prevent outward movement of pins 36 and 38. Means to engage the wall of cylindrical bores 40 and 42 comprises a steel ring 60 compressed in a groove 62 formed centrally of each fulcrum pin 36 and 38 to exert force until a force exceeding the frictional force of the ring 60 against the cylindrical walls 40 and 42 exerted on the pin 36 or 38. Fulcrum pins 36 and 38 are preferably equal distance from pivot 16.

A number of tips 64 may be inserted in a passage 66 formed in the end of movable jaws 12 and 14 and retained there by a set screw 68. Tips 64 may be of various sizes and shapes which are standard in the industry. Further, it should be appreciated that these tips 64 may be fixed on the end of the movable jaws 12 and 14 such that they are not movable or replaceable as illustrated.

Additional appliances may be added to movable jaws 12 and 14 to grasp, contract or expand as required for use on parts other than retaining rings, such as fuses, lights and other small parts which fit into sockets or grooves.

A typical retaining ring 70 has apertures 72 form in lugs 74 as illustrated in FIG. 1. The ends of tips 64 are inserted in apertures 72 and jaws 12 and 14 exert an inward force toward each other to collapse an internal retaining ring and exert an external force in the opposite direction if the ring is an external retaining ring.

Operation of the herein before described device is as follows:

FIG. 3 illustrates the arrangement of the fulcrum pins 36 and 38 to handle external retaining rings. Fulcrum pin 36 which is slideably disposed upwardly such that the end 48 engages aperture 52 in handle 24 and fulcrum pin 38 in slideably disposed outwardly such that end 50 engages aperture 58 in handle 26 to engage jaws 12 and 14 with handles 24 and 26. Therefore, any pressure against spring 30 moves movable jaws 12 and 14 outwardly to spread tips 64. As the tips 64 are secured in apertures 72 of retaining ring 70, the ring 70 is spread to be moved to or from a groove (not shown).

As best illustrated in FIG. 4, the fulcrum pins 36 and 38 are switched to set the tool 10 for internal retaining rings. Fulcrum pin 38 is moved up such that the end 48 engages aperture 54 in handle 24 connecting movable jaw 14 and handle 24. Fulcrum pin 36 is moved downwardly such that end 50 engages aperture 56 to connect jaw 12 with handle 26. As inward pressure is applied to handles 24 and 26 against spring 30 movable jaws 12 and 14 are moved inwardly to pull a retaining ring 70 inward such that it may be removed or replaced in a groove (not shown).

Thus, there are non-overlapping movable jaws 12 and 14 working in cooperation with the handles 24 and 26 and fulcrum pins 36 and 38 to alternately engage and disengage movable jaws 12 and 14 from handles 24 and 26 to change the pivot force exerted through the handles 24 and 26 to open and close the jaws 12 and 14. As illustrated in FIG. 1, inward force against handles 24 and 26 when pin 36 is engaged with handle 24 exerts the force about the pivot 16 to move jaws 12 and 14 outwardly. When pin 38 is moved upward, as illustrated in FIG. 4, inward force moves through the pivot 16 to move jaws 12 and 14 inwardly.

Figure 8:
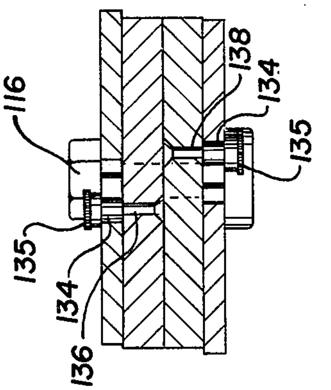
FIG. 8 is a cross-sectional view taken along line 8—8 of FIG. 6.
Figure 7:
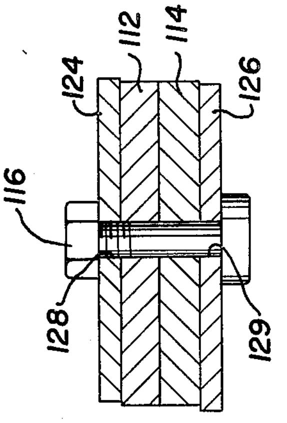
FIG. 7 is a cross-sectional view taken along line 7—7 of FIG. 6.
Figure 6:
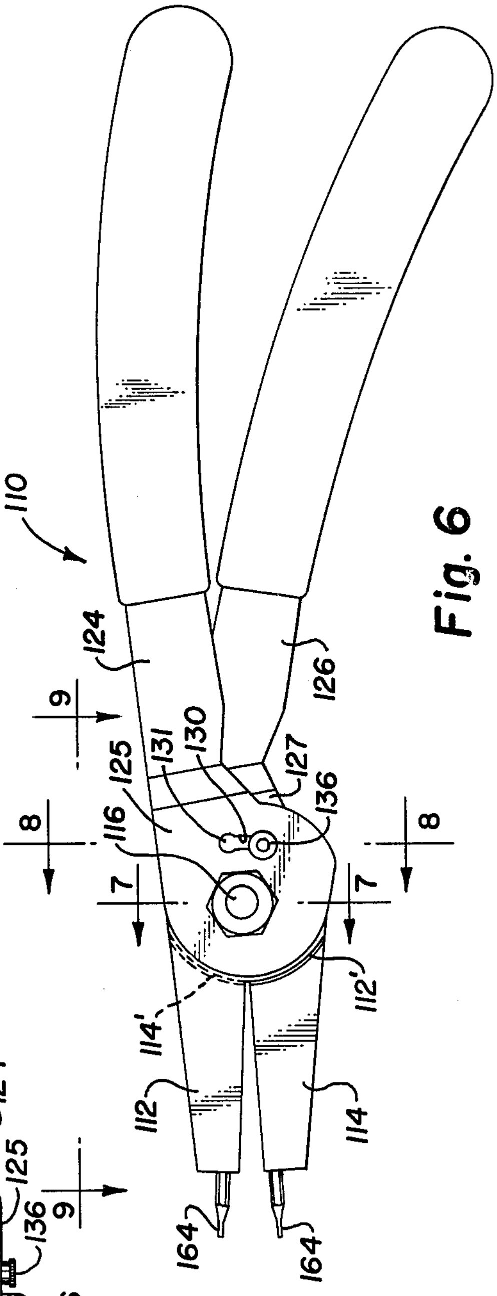
FIG. 6 is a plan view of the second embodiment of the tool.
Figure 9:
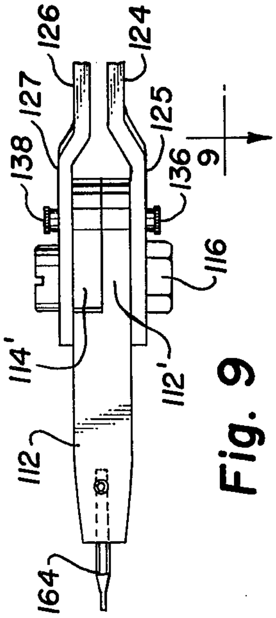
FIG. 9 is a side elevation view taken along line 9—9 of FIG. 6.

An alternative form of the pliers 110 is illustrated in FIGS. 6 through 8. As illustrated in FIG. 6, the device has overlapping jaws 112 and 114 movable about a central pivot 116 which passes centrally through heads 112' and 114; and handles 124 and 126 rotate about pivot 116 which extends through aligned apertures 128 and 129 formed in the central portion 125 and 127 of the handles 124 and 126.

Handles 124 and 126 are preferrable curved in a similar direction for reasons which will become apparent after further descriptions.

Means to secure handles 124 and 126 to jaws 112 and 114, respectively, generally comprises screws 136 and 138 through passages aligned with slot 130 formed on each of the handles 124 and 126. Slots 130 have enlarged ends 131 on each end of the slot to receive the reduced end 134 of thumb nut 135. From the foregoing, it should apparently be that by loosening thumb nut 135, the handles 124 and 126 may be shifted to the opposite end of the slot 130 and reduced end 134 may be placed in the enlarged end 131 to lock the handles 124 and 126 in place relative to jaws 112 and 114. In doing so, the handles 124 and 126 change places thus shifting the fulcrum point which coincides with screws 136 and 138 on opposite sides of the pivot 116 to change the tool from an internal retaining ring pliers to external retaining ring pliers. As illustrated in FIG. 6, a tool is set up for internal movement of tips 164. The handles 124 and 126 move approximately 30 degrees to change places with one another.

It should be readily apparent from the foregoing that each of the embodiments hereinbefore described accomplished the objects of the invention heretofore discussed.

It should be readily apparent that other embodiments of the invention might be devised without departing from the basic concept herein.

Having described my invention, I claim:

1. Retaining ring pliers comprising: a pivot; first and second coplanar movable jaws arranged to rotate about said pivot; first and second handles pivotally secured to said pivot on opposed sides of said first and second jaws; and attachment means disposed on each jaw for alternately engaging said first jaw to said first handle and said second jaw to said second handle in a first position and engaging said first jaw to said second handle and said second jaws to said first handle in a second position to shift a fulcrum point of each jaw to permit changing the pliers from a position wherein said jaws move inwardly as the handles are moved inwardly to a position wherein the jaws move outwardly as the handles are moved inwardly.

2. Retaining ring pliers according to claim 1, including a bearing shoulder formed on said first and second jaws about said pivot to receive said handles such that said first second handles pivot about said bearing shoulder.

3. Retaining ring pliers according to claim 1, wherein said attachment means comprises: first and second fulcrum pin slideably disposed in said first and second jaws, each fulcrum pin arranged to alternately engage said first and second handles.

4. Retaining ring pliers according to claim 3, wherein said fulcrum pins have an end formed thereon having a reduced diameter to form a shoulder to limit outward movement of said fulcrum pins such that the end slides into an aperture formed in each of the handles to engage same.

5. Retaining ring pliers according to claim 4 or 5, including means to limit sliding motion of the fulcrum pins in said first and second jaws.

6. Retaining ring pliers according to claim 5, wherein said means to limit sliding motion of the fulcrum pins comprises a ring disposed by a groove in said fulcrum pin to frictionally engage said jaw.

7. Retaining ring pliers according to claim 1, including means to urge said handles apart.

8. Retaining ring pliers comprising: a pivot; first and second coplanar jaws independently and movably secured about said pivot; first and second handles independently and rotatably secured about said pivot; a bearing shoulder formed on said first and second jaws about the junction with said pivot; said bearing shoulder being secured in a bearing passage formed in said handles; and fulcrum pins slideably disposed in each of said first and second jaws substantially equal distance from said pivot, said fulcrum pins are movable from a first position wherein said first handle and said first jaw and said second handle and said second jaw are operably secured to move the jaws outwardly as the handles move inwardly to a second position wherein said first handle and said second jaw and said second handle and said first jaw are operably secured to move said jaws inwardly as said handles are moved inwardly.

9. Retaining ring pliers comprising: a pivot; first and second jaws independently secured adjacent each other about said pivot and rotatable about said pivot, each of said jaws having tips which extend outwardly therefrom; first and second handles independently and rotatable secured about said pivot on opposed sides of said jaws, said first and second handles having a slot formed in spaced relation to the pivot, said slot having an enlarged end formed at each end on opposite sides of said pivot; studs extending outwardly of said first and second jaw through the slots formed in the first and second handle such that the handles move relative to the studs; and means moveable secured to said studs engaging the enlarged ends of said slot such that said first and second handles may be moved such that the studs of said first and second jaws are on opposite sides of said pivot and locked in said enlarged end of said slot permitting shifting of the fulcrum to permit changing the pliers between external and internal movement.

* * * * *